*BASIC DIRECTIONAL REFERENCE*

Oct. 18, 1966  H. W. E. SCHLITT ET AL  3,279,086
COMPENSATED GYROSCOPIC DIRECTIONAL REFERENCE
Filed Aug. 29, 1963  5 Sheets-Sheet 2

BASE MOTION COMPENSATION

INVENTORS.
HELMUT W. E. SCHLITT
HERBERT WINTER
BY Bean, Brooks, Buckley & Bean
ATTORNEYS $\delta_x, \delta_y$ = GYRO PICK-OFF ANGLES IN THE EAST AND NORTH AXES.
$\delta_x, \delta_y$ = BASE DEFLECTIONS ABOUT EAST AND NORTH AXES.
$\delta_z$ = DEVIATION OF GYRO NORTH AXIS FROM TRUE NORTH.
$\delta_{zi}$ = BASE DEFLECTION ABOUT THE AZIMUTH AXIS.

——————— INSTRUMENTATION
— — — — PHYSICAL DISTURBANCE

BASIC BLOCK DIAGRAM

BLOCK DIAGRAM INCLUDING LINEAR MOTION

REQUIRED INSTRUMENTATION

United States Patent Office 3,279,086
Patented Oct. 18, 1966

3,279,086
COMPENSATED GYROSCOPIC DIRECTIONAL
REFERENCE
Helmut W. E. Schlitt, Buffalo, and Herbert Winter, Snyder, N.Y., assignors to Bell Aerospace Corporation, Wheatfield, N.Y.
Filed Aug. 29, 1963, Ser. No. 305,486
6 Claims. (Cl. 33—226)

This invention has to do with gyroscopic directional references or indicators and, in particular, with an instrument which will indicate a fixed direction (with reference to inertial space) without error resulting from randomly oscillating translatory motions of its mounting base and/or small rotational motions of its mounting base.

Specifically, this invention is directed, in one form, to an instrument which is capable of indicating a fixed direction with reference to inertial space without error which may arise due to small rotations of the mounting base. For example, such an instrument would be useful in conjunction with an instrument having a tripod support structure for holding the mounting base a few feet above the ground and in which differential expansion or shrinkage rate of the legs or differential sinking rate of the legs into the ground would impart small rotation of the mounting base relative to the ground. In instances wherein the mounting base of the instrument is supported a substantial distance above the ground so that small rotations of the mounting base may be accompanied by substantial translatory movement of the mounting base, another form of the invention may be used in which errors arising from both of these motions may be compensated. An example of this latter form of the instrument might be in conjunction with automatic pre-launch alignment of missile guidance systems in which the instrument, mounted in the nose of a missile of substantial height, would be subjected both to mounting base rotation and mounting base translation due to bending effects of the missile under the influence of wind loads.

Accordingly, it is a primary object of this invention to provide an earth-mounted azimuth directional reference which reliably performs its intended function without requiring a highly stable mounting platform. In this manner, the necessity for a highly stable mounting platform which inherently requires elaborate and complex stabilizing equipment (for example, completely instrumental Schuler loops) and whose size, weight and cost are prohibitive for many applications, is eliminated.

Basically, the invention achieves its objects by substituting for a completely stabilized platform a relatively free platform carrying a two-degrees-of-freedom gyroscope, the platform also carrying accelerometers for sensing platform angular motions about two orthogonal axes which are mutually perpendicular to the rotation axis (spin axis) of the gyro mass. The output signals of these accelerometers, properly shaped or modified, are used directly to compensate the directional indications of the instrument, and not (as in known systems) to perform an intermediate stabilization of the base itself. Since the desired result is a directional reference (herein specifically an azimuthal direction), the condition of the platform or mounting base, as such, is a matter of relative indifference.

The invention will be described in the following detailed specification, with reference to preferred embodiments which are similar to one another in principle but differ in the extent of the compensations provided to suit different applications; for example, in the case of an earth-mounted instrument and one carried by a missile before launch. It will be understood that the details are intended as illustrative and not restrictive, the scope of the invention being defined in the claims.

A rotating (gyroscopic) mass tends to maintain its rotational axis, called the spin axis, in a fixed orientation with reference to inertial space, which may be taken as a frame of reference defined by the positions of the fixed stars. For the establishment of directional references relative to the earth, which is of course in motion through inertial space, a simple gyroscope as described is entirely inadequate. Moreover, even if a gyro is equipped with known earth-referencing instrumentation, the validity of its indications depends upon its being mounted on a platform which is itself stable with respect to the earth.

Figure 1:
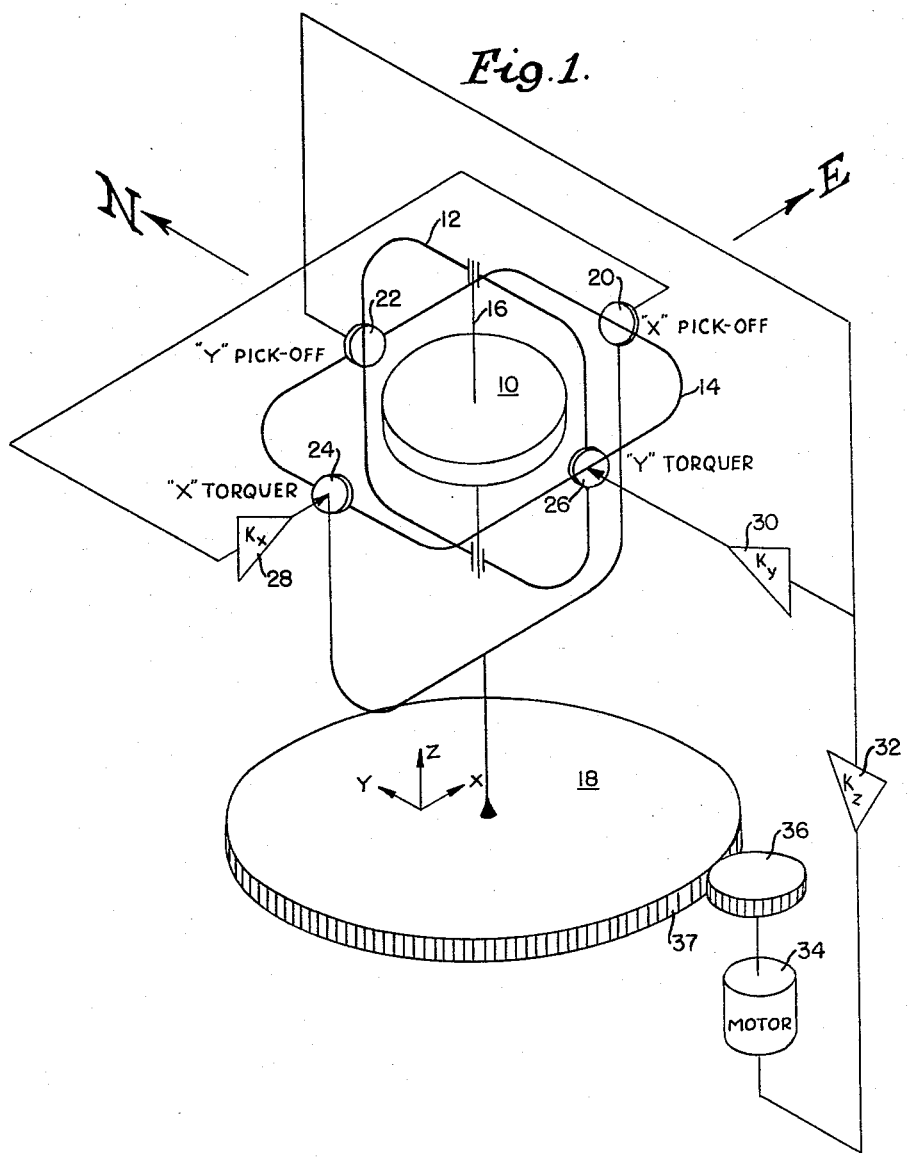
FIG. 1 is a schematic and functional perspective view of a simple form of known gyro directional reference, provided to illustrate the basic environment and background of the invention.

Consider, with reference to FIG. 1 of the drawings, the case of a so-called "free" gyro 10 mounted in gimbal bearings 12, 14 for free rotation about orthogonal axes which are both nominally perpendicular to the spin axis 16, and the whole carried by a platform or casing 18 stabilized with respect to the earth; there being respective pick-offs or transducers 20 and 22 for sensing rotations of the gimbal bearing axes with respect to the platform. Neglecting gyro drift, the only angular rate acting on such a gyro is that due to rotation of its platform 18 relative to inertial space. The platform 18 is mounted on a base (not shown) about an axis perpendicular to and centrally located with respect to such platform 18. The motor 34 is carried by the base and reacts against the platform for pivoting the platform about such axis. If the platform is solidly mounted on the earth, this rate is that due to the earth's rotation, and the pick-offs 20 and 22 will produce output signals proportional to those components of the earth's rotation lying along the pick-off (gimbal bearing) axes. If one of the pick-off axes (e.g., that of pick-off 20) is made or set so as to be horizontal, and the platform 18 is turned until the output signal from that pick-off is zero, then the sensing axis of that pick-off 20 must be perpendicular to the earth's rotation vector. Since the said sensing axis is also horizontal, it must be directed east-west, and will thus provide a unique directional reference, except in the trivial instance in which the instrument is located at a pole of the earth, at which the east-west direction is meaningless.

In the foregoing, the only requirement as to the position of the spin axis 16 is that it be perpendicular to the east-west direction; that is, lying in the meridian plane. For most two-degrees-of-freedom gyros, drift is minimized by mounting the gyro with its spin axis 16 vertical. Since this orientation is compatible with the other considerations just stated, a vertical spin-axis direction will be assumed for illustrative purposes in the remainder of this specification.

So long as the spin axis 16 remains vertical, an east-west directional reference will result from a rotation of the gyro platform 18 in azimuth (as already explained) until the east-west pick-off signal is zero. However, the north component of the earth's rotation rate will tend to tilt the spin axis 16 with respect to the earth. A conventional way of preventing this departure is to provide a torquer for each of the east-west and north-south axes, these torquers 24 and 26 comprising well-known motor drives responsive to input signals and connected to apply torques to the respective gimbals 14 and 12. The output of the east-west pick-off 20 is connected through an amplifier 28 to the east torquer 24, and the output of the north-south pick-off 22 is similarly connected through amplifier 30 to the north torquer 26.

The resulting combination, called a rate gyro, is such that the earth's rate component about the north axis will cause a constant deflection of the gyro about the east axis, resulting in a constant signal from east pick-off 20 such that the resulting torque applied to the east axis torquer 24 causes the gyro to precess at a rate precisely equal to the north component of the earth's rate. At the same time, this rate-gyro loop will keep the output signal of the north pick-off 22 at zero; provided, of course, that the gyroscope's east axis is indeed aligned with the actual east direction on the earth.

If the gyro east axis is not in fact aligned with the east direction, the output of the east pick-off 20 will change, and the rate gyro loop will cause a corresponding change in the torque or effort of torquer 24 about that axis, and the gyro will suffer additional precession about the north axis, causing an output from the north pick-off 22. This output, however, is also applied to the amplifier 32 which controls the motor 34 and associated pinion 36 for rotating the platform 18 in azimuth so that the north pick-off output signal is returned to zero, all in the well known manner.

Considering now the effect of gyro drift, it is clear that the effect of such drift about the north axis, being superimposed on the north component of the earth's rotation, will affect only the average value of the east pick-off signal, and specifically will not affect the azimuth indication. On the other hand, drift about the east axis will not be distinguishable from an earth's rotation component, and will have to be compensated by an azimuth misalignment such that the earth's rate component along the gyro east axis is equal and opposite to the gyro drift. This is expressed by the equation:

(1) $$\Omega_H \sin \delta_z = -\omega_{gx}$$

where:

$\Omega_H$=horizontal component of earth's rotation
$\delta_z$=azimuth misalignment angle
$\omega_{gx}$=gyro drift about its east axis.

For small errors, Equation 1 may be written:

(2) $$\delta_z \cong -\frac{\omega_{gx}}{\Omega_H}$$

since the sine of a small angle approximates its value in radians.

It is easy to see that a rotation of platform 18 will affect the system in the same way as gyro drift; the system cannot distinguish as between platform motion and earth's rotation any more than it can between gyro drift and earth's rotation. Any platform rotation about the east axis of FIG. 1 will therefore seriously affect the accuracy of the directional reference; this is the reason for prior art provisions for an elaborately stabilized platform. Rotations of the platform about the north axis will, at least to a first approximation, have little or no effect on the accuracy of the directional indication.

Figure 2:
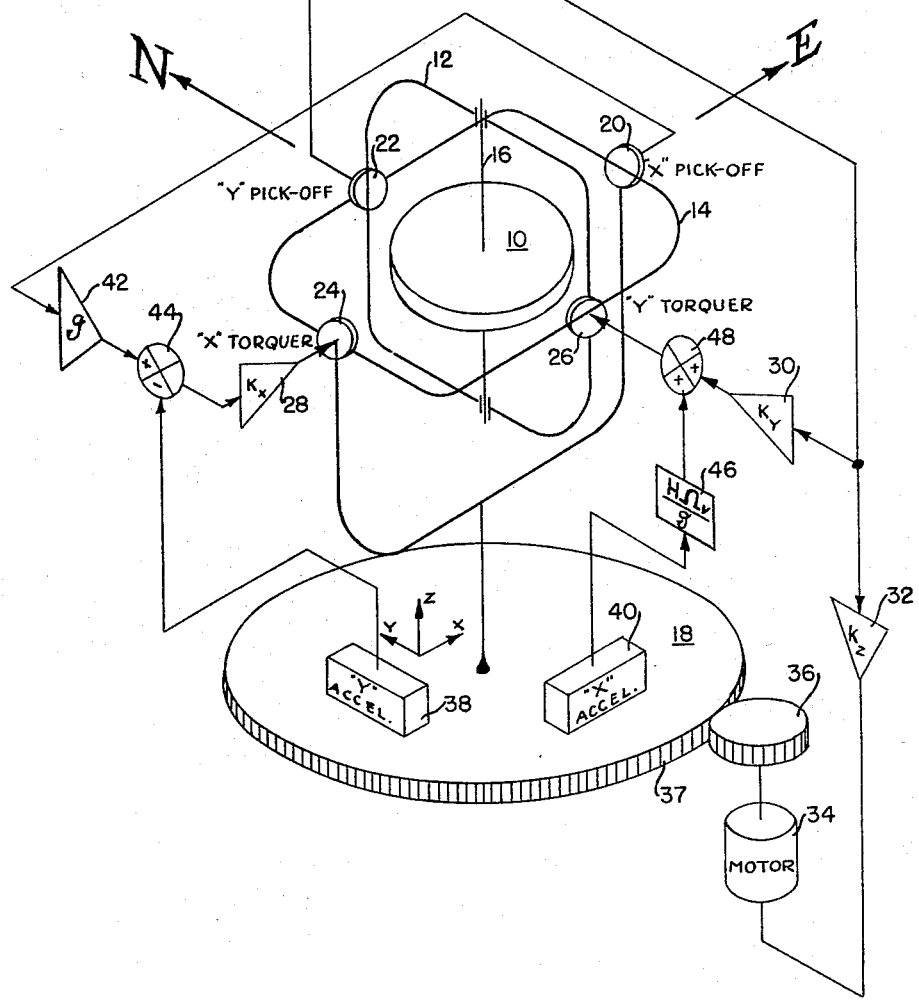
FIG. 2 is a view similar to FIG. 1 with added components conforming to the teachings of the present invention and illustrating that form of the invention which may be used when only small rotations of the mounting base are significant.

System of FIG. 2

A typical source of rotation rate of the platform mounting base is a warping of the surface on which the base is supported; e.g., differential expansion of the legs of a tripod or other support, or a differential sinking rate of the legs in the ground. One form of the present invention solves this base-stabilization problem by avoiding it altogether, and instead sensing the angular tilt motions of the unstabilized base and platform by sensors independent of the gyro reactions. Specifically, and as shown in FIG. 2, platform 18 is provided with respective accelerometers 38 and 40, accelerometer 38 producing an output signal which is a function of the component of gravity proportional to the tilt angle about the east axis. That is, the sensitive axis of accelerometer 38 is parallel to the "y" or north axis. By adjusting the output of pick-off 20 through the amplifier 42 having a gain constant equal to the acceleration of gravity to make this adjusted signal compatible with the output of accelerometer 38, algebraic addition of the accelerometer signal and the adjusted signal from pick-off 20 may be accomplished as at the subtractor circuit 44. For small rotation of the base about the east axis the adjusted output of pick-off 20 caused by such rotation will be exactly cancelled by the output of accelerometer 38. The gyro therefore remains unaffected by the base rotation about the east axis, and no azimuth misalignment is needed to generate drift compensation through gyro precession as in the known systems as typified by FIG. 1. Thus, north alignment is preserved despite rotations of platform 18 about the east axis. It is to be understood that the null drift of accelerometer 38 must be less (in g's per hour) than the gyro drift in radians per hour.

It will be appreciated that a component of motion of the base solely about the east axis will not be the usual case, but that usually there will also be a component of rotation about the north axis. If motion of the base about the north axis were permitted to occure, the east axis would no longer be horizontal and such misalignment would cause east pick-off 20 to pick up a portion of the vertical component of earth's rotation equal to:

(3) $$(\omega_x)_y = -\Omega_v \sin \delta_y$$

where:

$(\omega_x)_y$=rotation rate about gyro east axis due to misalignment about the north axis
$\Omega_v$=vertical component of earth's rotation
$\delta_y$=tilt angle about the north axis.

Normal action would be to compensate this rate by rotating the instrument in azimuth. Since the rotation rate about the east axis due to azimuth rotation is (4) $$(\omega_x)_z = \Omega_H \sin \delta_z$$

the system will settle when (5) $$(\omega_x)_y + (\omega_x)_z = 0$$

which, from Equations 3 and 4, and solving for sin $\delta_z$ gives (6) $$\sin \delta_z = \frac{\Omega_v}{\Omega_H} \sin \delta_y = \tan \lambda \sin \delta_y$$

or, for small valves of $\delta_y$ and $\delta_z$ (7) $$\delta_z = \delta_y \tan \lambda$$

where $\lambda$ is the latitude.

Since the present instrument is intended for use at various latitudes, Equation 7 illustrates that azimuth misalignment $\delta_z$ would be excessive at appreciable latitudes. For example, at a latitude of 45 degrees, the azimuth misalignment of the directional reference would equal the leveling error $\delta_y$ about the north axis, which is clearly excessive for the proposed applications of this instrument.

To compensate for this effect, the accelerometer 40, identical with 38 but having its sensing axis parallel to the "x" direction, has its output in g's multiplied by the vertical component of earth's rotation ($\Omega_v$) and by the gyro's angular momentum (H) at multiplier circuit 46, and applied additively at adder 48 to the torquer 26 (that is, additively to the signal from amplifier 30) to precess the gyro about the x axis at a rate equal and opposite to that indicated in Equation 3 above. It is to be noted that the multiplier must have a gain $H\Omega_v/g$ to make the output of the accelerometer 40 compatible with the scaling implied by Equation 3. In particular, multiplication by H is required since the torque $T_y$ required to produce a given precession $\omega_x$ is numerically equal to $H\omega_x$.

Figure 3:
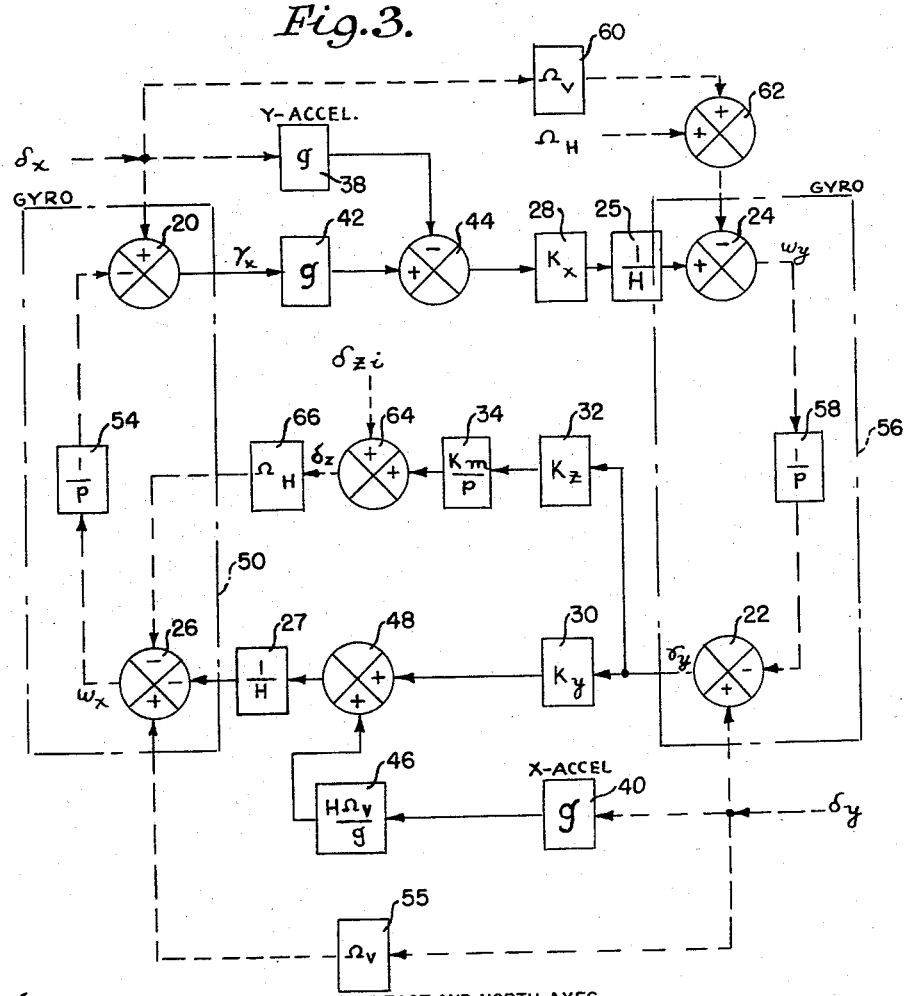
FIG. 3 is a schematic block diagram showing the relationships between functional components of the instrument shown in FIG. 2.

FIG. 3 of the drawings corresponds in principle with FIG. 2, but in view of the desirability for illustrating not only the physical components but the transfer functions of the signal and control channels, FIG. 3 has been drawn purely in block form. Corresponding numerals have been used for components which are the same as those shown in FIG. 2, and the parts which are physically related to the gyro x and y axis torquers and pick-offs have been separated at the left and right sides of FIG. 3 for clarity. Thus, the dash-line box designated 50 is shown as containing the x axis pick-off 20 whose electrical output signal is added in adder 44 (after multiplication by acceleration due to gravity as indicated at multiplier 42) to the electrical signal from the y axis accelerometer 38.

It will be noted that the block 50 show the x axis pick-off 20 as an adder, but this does not mean that an electrical adding circuit is present. The addition symbol is used here to signify that the output of pick-off 20 is the result of combined physical disturbances (shown by the dashed flow lines) resulting from the tilt of platform 18 about the x axis ($\delta_x$) and the tilt of the spin axis resulting from the physical integration indicated at 54 from the precession rate $\omega_x$ due to the torque output of the y axis torquer 26. For a similar reason, the y axis torquer 26 is itself shown as an adder in FIG. 3. The x axis torquer 24 and the y axis pick-off 22 are similarly shown in the dashed line block 56 at the right of FIG. 3. Blocks 25 and 27 represent the division by the gyro's angular momentum which is inherent in the instrument when converting from torque to precission rate. The "1/p" symbol applied to the integration functions at 54 and 58 in blocks 50 and 56 is conventional notation for the inverse differential operator (integrator) as is well known by those skilled in dynamics. It is used here to indicate the integration of precession rates to obtain angular pick-offs.

Still referring to FIG. 3, the rotation rates of the gyro spin axis with respect to the earth are designated by $\omega_x$ and $\omega_y$. Starting at the upper left of FIG. 3, the adding network 20 used as a symbol for the x axis pick-off 20 of FIG. 2 signifies that the gyro pick-off angle from this pick-off is equal to the difference between the angle of tilt of the platform 18 about the x axis, $\delta_x$, and the angle of departure from vertical of the spin axis; this latter departure angle is, of course, the integral of $\omega_x$ which is the angular rate of precession about the x axis due to the physical action of the y axis torquer 26 on gimbal 12 in FIG. 2. The signal $\gamma_x$ from x axis pick-off 20 is added to the output of the y accelerometer 38 after a multiplication of the former by a constant term proportional to the force of gravity (as at 42) to make the two signals commensurate. The resultant output of adder 44 is applied to the x axis torquer 24 through the amplifier 28 having the transfer function $K_x$. The application of this composite signal to the x axis torquer 24 causes precession of the gyro about the y axis at the angular rate $\omega_y$. However, motion of the spin axis about the y axis is also caused by the horizontal component of earth's rotation, $\Omega_H$, and by the product (indicated at multiplier 60) of the vertical component of the earth's rate, $\Omega_v$, and the misalignment about the x axis. Numeral 62 symbolizes by an adder the relationship of these physical disturbances insofar as they affect the result produced at x axis torquer 24.

Considering, now, the lower right corner of FIG. 3, the y axis pick-off signal $\gamma_y$ is obtained in a manner analogous to that described for the x axis pick-off signal $\gamma_x$. The y axis pick-off 22 is again shown as an "adding" function since it is influenced both by the y axis tilt and the precessional moment resulting from the integration (indicated at 58) of the y axis rate $\omega_y$ due to the action of the x axis torquer 24. The y axis pick-off signal $\gamma_y$ is applied through amplifier 30, having the gain transfer function $K_y$, to the y axis torquer 26 as already described. Also, the output signal of the x axis accelerometer 40, after multiplication by $H\Omega_v/g$ at 46 is added to the output of amplifier 30 in the adding network 48 and applied to the y axis torquer 26 to compensate for the effect produced by misalignment about the y axis, indicated schematically by the dashed line from "$\delta_y$" through multiplier 55 to the y axis torquer 26.

The y axis pick-off signal $\gamma_y$ is also applied through amplifier 32 having the transfer function $K_z$ to the motor symbolized at 34 which rotates the platform 18 about the azimuth or z axis. As more graphically shown in FIG. 2, motor 34 drives a pinion 36 meshing with gear teeth 37 about the periphery of platform 18, or a gear attached to such platform. Reverting to FIG. 3, the azimuth misalignment, $\delta_z$, is equal to the sum of the angular rotation of the platform produced by the motor, and the azimuth disturbance $\delta_{zi}$. This summing is indicated by the adding function symbol 64, and its physical effect as to rotation about the x axis is indicated by the dash line connecting the multiplying function 66 to the y axis torquer 26; multiplier 66 representing the physical effect of Equation 1.

Examination of FIG. 3 indicates two parallel channels from the y pick-off 22 to the y torquer 26, one through amplifier 30, the other through amplifier 32 and motor 34. By adding a first order lead term (differentiation) to the gain of amplifier 32, amplifier 30 may be eliminated without any change in system performance. This is shown in FIG. 4, where amplifier 74 replaces amplifiers 30 and 32 of FIG. 3.

The use of accelerometers as described above, together with the circuitry outlined, provides an adequate solution in cases where the gyroscopic directional reference mounting is subjected only to tilting motions. It may, however, be desired to use such instrumentation in a situation involving small tilting motions as well as appreciable linear motion, as might occur for example if the directional reference were mounted at or near the top of a missile ready for launching. In this situation, bending of the missile under wind loads may well produce significant linear motion as well as tilting of the directional reference base so that the accelerometers will not only measure the gravitational components which develop along their sensitive axes in connection with the tilting of the mounting or base; but they will also sense and indicate the accelerations resulting from the translatory motions of the base. These are reflected as errors in the sensing of base tilt, and produce disturbances of the system which continuously upset the operation of the gyroscope. The aspect of the invention which will now be described accomplishes a judicious compensation for these disturbances, so as to render this form of the invention useful in such translatory applications.

Figure 4:
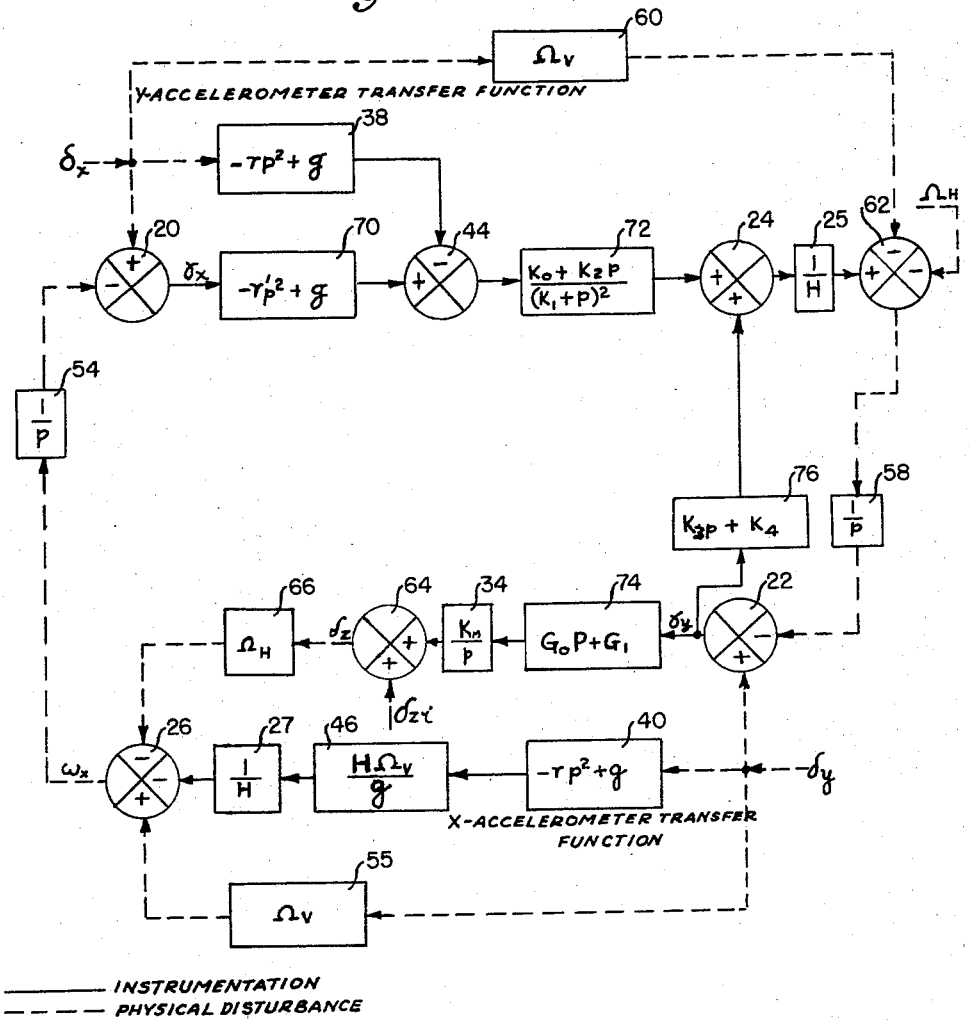
FIG. 4 is a block diagram similar to FIG. 3 but including the additional components and channels required for linear-motion compensation, according to a modified form of the invention.

Due to the additional components required, the showing of this form of the invention is also somewhat clearer in a pure block diagram form, and FIG. 4 is such a presentation. However, a combined structure and function representation of this aspect of the invention is also provided; see FIG. 5.

In FIG. 4, the transfer function of each accelerometer is therefore no longer merely g as in FIG. 3, but becomes $-rp^2+g$, where r is the distance from the instrument to the center of rotation. To compensate for this effect, the output of the x axis pick-off $\delta_x$ is put through a channel 70 having a similar transfer function, as indicated. It will be recognized by those skilled in the art that "$r'p^2$" signifies the multiplication of the instantaneous value of $r'$ by the second derivative of the input $\delta_x$ from x axis pick-off 20. The symbol $r'$ merely signifies that an approximate value of the distance $r$ is used, as opposed to an actual value; the actual value may not be precisely known in a practical case, due to bending and other effects.

The negative sign prefixed to $r'p^2$ in the transfer function raises a stability problem, particularly where the component due to linear motion approaches the magnitude of the gravitational effect $g$. This may be true in the mentioned case where the directional reference is mounted atop a missile of substantial height in which wind gusts may impart substantial linear acceleration to the instrument base; or the same situation may prevail in the case of a directional reference mounted in a ship weathering heavy seas, in which pitch and roll motions of the ship might well impart appreciable linear accelerations to the instrument base. In any case, it has been determined that the specific transfer functions indicated in FIG. 4 yield a stable system with acceptable system errors. These transfer functions include a second-order lag 72 in place of the transfer function $K_x$ of amplifier 28 of FIG. 3; a first-order lead 74 to provide for the combined effects of amplifiers 30 and 32 in FIG. 3, as explained earlier; and an additional feed-back network 76 between the $y$ axis pick-off output from 22 and the $x$ axis torquer 24. The indicated transfer function for this last network is needed in order to reduce $\gamma_y$ and, with it, $\delta_z$.

Figure 5:
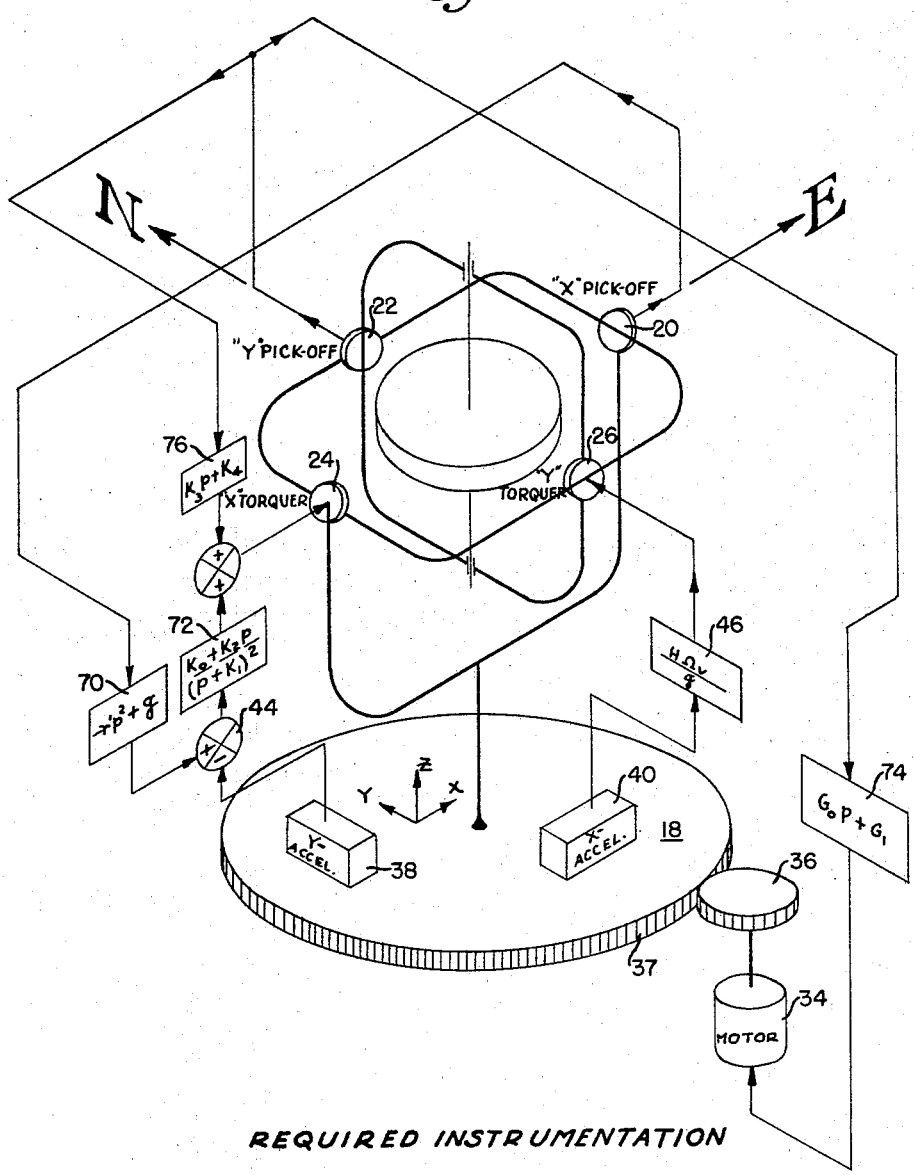
FIG. 5 is a view similar to FIG. 2 showing the instrumentation and arrangement of the FIG. 4 system.

It will be noted from FIGS. 4 and 5 that the system therein basically requires four amplifiers; an amplifier 70 at the $x$ axis pick-off 20 to provide a second-order lead term to add to the $y$-accelerometer; an amplifier 72 providing a second-order lag term from the output of the summing network 44 to be applied to the $x$ torquer 24; an amplifier (74, 76) at the $y$ axis pick-off 22 to provide a first-order lead feed-back signal to the $x$-torquer 24 and a first-order lead term to the azimuth drive motor; and an amplifier 46 to provide base motion compensation to the $y$-torquer 26.

It is understood that certain changes and modifications as illustrated and described may be made without departing from the spirit of the invention or the scope of the following claims.

1. In a gyroscopic directional reference of the type having a base, a platform, and means mounting said platform on said base about a mounting axis perpendicular to the plane of said platform,
   a gyroscope rotor housing carried by said platform in suspension means defining two mutually perpendicular axes for rotation of the gyroscope spin axis relative to the plane of said platform,
   gyro torquers connected so as to cause gyroscopic precession about each of said two perpendicular axes and rotational pick-off transducers connected so as to measure, the angular motion of said gyroscope rotor housing relative to said suspension means about each of said two perpendicular axes,
   motor means connected to the output of one of said pick-off transducers for rotating said platform about said mounting axis for orienting that axis associated with said one pick-off transducer in north-south direction with the axis of the other pick-off transducer in the east-west direction;
   a first accelerometer on said platform for detecting motion thereof about said east-west axis,
   summing means for algebraically summing the output of the pick-off of said east-west axis and the output of said first accelerometer and having an output connected to the torquer of said east-west axis whereby the orientation of said north-south axis is maintained independent of platform motion about said east-west axis, and
   a second accelerometer on said platform for detecting motion thereof about said north-south axis,
   the output of said second accelerometer being applied to the torquer of said north-south axis, whereby the orientation of said north-south axis is maintained independent of platform motion about said north-south axis.

2. In the gyroscopic directional reference as defined in claim 1, an amplifier between the output of the east axis pick-off transducer and said summing means to provide a second-order lead term to the output of said first accelerometer,
   an amplifier providing a second-order lag term between the output of said summing means and said east axis torquer,
   amplifier means providing (1) a first-order lead feed-back signal between the output of the north axis pick-off transducer and said east axis torquer and (2) a first-order lead signal between the output of said north axis pick-off transducer and said motor means.

3. A gyroscopic directional reference comprising a base, a platform and means mounting said platform on said base about a mounting axis perpendicular to the plane of said platform,
   a gyroscope rotor housing carried by said platform in suspension means defining two mutually perpendicular axes for rotation of the gyroscope spin axis relative to the plane of said platform,
   gyro torquers connected so as to cause gyroscopic precession about each of said two perpendicular axes and rotational pick-off transducers connected so as to measure the angular motion of said gyroscope rotor housing relative to said suspension means about each of said two perpendicular axes,
   a pair of accelerometers on said platform having their sensitive axes respectively perpendicular to the vertical planes of said two perpendicular axes,
   motor means for rotating said platform about said mounting axis,
   an amplifier connected to apply the output signal from one of said pick-offs to the torquer connected to the axis of said one pick-off,
   means for modifying the output of said amplifier in accordance with the output signal of the accelerometer whose sensitive axis is perpendicular to the axis of said one pick-off,
   means for controlling the other of said torquers in accordance with the output of said other accelerometer, and
   an amplifier connecting the output of the other of said pick-offs to said motor means.

4. A gyroscopic directional reference in accordance with claim 3, and means for modifying the output signals of said accelerometers in accordance with the geographic latitude of said gyroscopic directional reference.

5. A gyroscopic directional reference in accordance with claim 3, and means for modifying the output signals of said accelerometers in accordance with the geographic latitude of said gyroscopic directional reference.

6. A gyroscopic directional reference comprising a base, a platform and means mounting said platform on said base about a mounting axis perpendicular to the plane of said platform,
   a gyroscope rotor housing carried by said platform in suspension means defining two mutually perpendicular axes for rotation of the gyroscope spin axis relative to the plane of said platform,
   gyro torquers connected so as to cause gyroscopic precession about each of said two perpendicular axes and rotational pick-off transducers connected so as to measure the angular motion of said gyroscope rotor housing relative to said suspension means about each of said two perpendicular axes,
   motor means for rotating said platform about said mounting axis,
   a pair of accelerometers on said platform having their sensitive axes respectively perpendicular to the vertical planes of said two perpendicular axes, amplifiers connected to apply the output signal from each respective pick-off to the torquer connected to precess the gyroscope rotor housing about the axis of the other pick-off, means for modifying the output of each of said amplifiers in accordance with the output signal of a respective one of said accelerometers, and an amplifier connecting the output of one of said pick-offs to said motor means.

References Cited by the Examiner

UNITED STATES PATENTS

| | | | |
|---|---|---|---|
| 1,503,436 | 7/1924 | Tanner | 33—226 |
| 1,998,948 | 4/1935 | Wittkuhns et al. | 33—226 |
| 2,752,792 | 7/1956 | Draper et al. | |
| 2,902,772 | 9/1959 | Ciscel | 33—226 |
| 2,981,113 | 4/1961 | Erdley. | |

ROBERT B. HULL, *Primary Examiner.*

UNITED STATES PATENT OFFICE
CERTIFICATE OF CORRECTION

Patent No. 3,279,086                                        October 18, 1966

Helmut W. E. Schlitt et al.

It is hereby certified that error appears in the above numbered patent requiring correction and that the said Letters Patent should read as corrected below.

Column 8, lines 49 to 52, for "means for modifying the output signals of said accelerometers in accordance with the geographic latitude of said gyroscopic directional reference" read -- a feedback amplifier connecting the output of said other of said pick-offs to the torquer connected to the suspension at the axis of said one pick-off --.

Signed and sealed this 5th day of September 1967.

(SEAL)
Attest:

ERNEST W. SWIDER                                        EDWARD J. BRENNER
Attesting Officer                                            Commissioner of Patents